United States Patent
Shafiee et al.

(10) Patent No.: US 9,380,487 B2
(45) Date of Patent: Jun. 28, 2016

(54) SYSTEM AND METHOD FOR A LOCATION PREDICTION-BASED NETWORK SCHEDULER

(71) Applicant: Huawei Technologies Co., Ltd., Shenzhen (CN)

(72) Inventors: Kaveh Shafiee, North Vancouver (CA); Hang Zhang, Nepean (CA); Aaron James Callard, Ottawa (CA); Alex Stephenne, Stittsville (CA); Hamidreza Farmanbar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/445,889

(22) Filed: Jul. 29, 2014

(65) Prior Publication Data

US 2016/0037379 A1    Feb. 4, 2016

(51) Int. Cl.
*H04L 12/28* (2006.01)
*H04J 3/00* (2006.01)
(Continued)

(52) U.S. Cl.
CPC .............................. *H04W 28/0268* (2013.01)

(58) Field of Classification Search
CPC ......... H04W 4/02; H04W 4/028; H04W 4/04; H04W 4/046; H04W 28/0268; H04W 40/026; H04W 40/18; H04W 40/20; H04W 64/00; H04W 64/006; H04W 84/005; H04W 84/18; H04L 67/18; G08G 1/01; G08G 1/0104; G01S 5/0027; B60W 30/08; B60W 30/095; B60W 40/04; B60W 50/16; B60W 2050/143; B60W 2050/46; B60W 2520/10; B60W 2540/20; B60W 2550/10; B60W 2550/14; B60W 2550/22; B60W 2550/141; B60W 2550/142; B60W 2550/146; B60W 2550/406; B60W 2550/408

USPC ......... 370/229–240, 252, 314, 321, 326, 330, 370/336–338, 345, 347, 389–401, 436–437, 370/442, 446, 478, 498, 508; 455/403–466; 709/217–244
See application file for complete search history.

(56) References Cited

U.S. PATENT DOCUMENTS 6,748,233 B1 * 6/2004 Arnold .................. H04W 52/22
                                                        455/456.3
(Continued)

FOREIGN PATENT DOCUMENTS

WO    2005119978 A1    12/2005
WO    2007136567 A2    11/2007
(Continued)

OTHER PUBLICATIONS

International Search Report and Written Opinion of the International Searching Authority received in Patent Cooperation Treaty Application No. PCT/CN2014/092607 mailed Mar. 4, 2015, 12 Pages.
(Continued)

*Primary Examiner* — Tri H Phan
(74) *Attorney, Agent, or Firm* — Slater Matsil, LLP

(57) ABSTRACT

Embodiments are provided for traffic scheduling based on user equipment (UE) in wireless networks. A location prediction-based network scheduler (NS) interfaces with a traffic engineering (TE) function to enable location-prediction-based routing for UE traffic. The NS obtains location prediction information for a UE for a next time window comprising a plurality of next time slots, and obtains available network resource prediction for the next time slots. The NS then determines, for each of the next time slots, a weight value as a priority parameter for forwarding data to the UE, in accordance with the location prediction information and the available network resource prediction. The result for the first time slot is then forwarded from the NS to the TE function, which optimizes, for the first time slot, the weight value with a route and data for forwarding the data to the UE.

28 Claims, 6 Drawing Sheets

(51) Int. Cl.
  *H04B 7/212*   (2006.01)
  *H04W 24/00*   (2009.01)
  *G06F 15/173*  (2006.01)
  *H04W 28/02*   (2009.01)

(56) References Cited

U.S. PATENT DOCUMENTS

| | | | | |
|---|---|---|---|---|
| 7,912,458 B2 * | 3/2011 | Ramer | ............. | G06F 17/30905 |
| | | | | 455/414.1 |
| 7,983,662 B1 * | 7/2011 | Ramer | ............. | G06F 17/30905 |
| | | | | 455/411 |
| 8,000,888 B2 * | 8/2011 | Kim | ................ | G08G 1/096716 |
| | | | | 340/995.13 |
| 8,060,274 B2 * | 11/2011 | Boss | ...................... | G06Q 10/06 |
| | | | | 340/994 |
| 8,385,921 B1 | 2/2013 | Shousterman et al. | | |
| 8,706,131 B2 * | 4/2014 | Winters | ............... | G01S 5/0027 |
| | | | | 340/988 |
| 8,842,578 B1 | 9/2014 | Zisapel et al. | | |
| 8,949,420 B2 * | 2/2015 | Banavar | .................. | H04L 67/16 |
| | | | | 709/225 |
| 9,060,292 B2 * | 6/2015 | Callard | | |
| 2004/0017796 A1 | 1/2004 | Lemieux et al. | | |
| 2005/0169266 A1 | 8/2005 | Aggarwal et al. | | |
| 2006/0010250 A1 | 1/2006 | Eisl et al. | | |
| 2006/0258371 A1 * | 11/2006 | Krishnamurthi | ........ | H04W 4/02 |
| | | | | 455/456.1 |
| 2011/0153805 A1 | 6/2011 | Beninghaus et al. | | |
| 2011/0206012 A1 * | 8/2011 | Youn | ..................... | H04W 36/30 |
| | | | | 370/332 |
| 2011/0237257 A1 | 9/2011 | Soliman et al. | | |
| 2011/0264795 A1 | 10/2011 | Koide et al. | | |
| 2014/0003232 A1 | 1/2014 | Guichard et al. | | |
| 2014/0171106 A1 * | 6/2014 | Cheng | ................. | H04W 64/006 |
| | | | | 455/456.1 |
| 2014/0179335 A1 * | 6/2014 | Pikhletsky | ........ | H04W 72/0453 |
| | | | | 455/452.2 |
| 2014/1071106 | 6/2014 | Cheng et al. | | |
| 2014/0185581 A1 * | 7/2014 | Senarath | ........... | H04W 36/0083 |
| | | | | 370/331 |
| 2014/0254373 A1 | 9/2014 | Varma | | |
| 2014/0310388 A1 | 10/2014 | Djukic et al. | | |
| 2014/0376406 A1 | 12/2014 | Kim et al. | | |
| 2015/0072705 A1 * | 3/2015 | Zhang | ................... | H04W 4/028 |
| | | | | 455/456.1 |
| 2015/0163147 A1 * | 6/2015 | Li | .......................... | H04L 47/18 |
| | | | | 370/236 |
| 2015/0195745 A1 * | 7/2015 | Farmanbar | ........... | H04W 28/12 |
| | | | | 370/236 |

FOREIGN PATENT DOCUMENTS

| | | |
|---|---|---|
| WO | 2011014558 A2 | 2/2011 |
| WO | 2013097900 A1 | 7/2013 |

OTHER PUBLICATIONS

Han, T., et al. "Opportunistic Content Pushing via WiFi Hotspots," 3rd IEEE International Conference on Network Infrastructure and Digital Content (IC-NIDC), Sep. 21-23, 2012, 5 pages.

International Search Report and Written Opinion of the International Searching Authority received in Patent Cooperation Treaty Application No. PCT/US2015/010340 mailed May 1, 2015, 9 pages.

Han, T., et al., "Opportunistic content pushing via WiFi hotspots," 3rd IEEE International Conference on Network Infrastructure and Digital Content (IC-NIDC), IEEE 978-1-4673-2204-1/12, Sep. 21-23, 2012, pp. 680-684.

International Search Report received in Application No. PCT/CN2015/085338, mailed Nov. 3, 2015, 11 pages.

Emilie, D et al., "A Practical Algorithm for Balancing the Max-Min Fairness and Throughput Objectives in Traffic Engineering," 2012 IEEE INFOCOM Proceedings, Mar. 25-30, 2012, 9 pages.

Han, T., et al. "Opportunistic content pushing via WiFi hotspots," 3rd IEEE International Conference on Network Infrastructure and Digital Content (IC-NIDC), IEEE 978-1-4673-2204-1/12, Sep. 21-23, 2012, pp. 680-684.

* cited by examiner

SYSTEM AND METHOD FOR A LOCATION PREDICTION-BASED NETWORK SCHEDULER

TECHNICAL FIELD

The present invention relates to the field of network communications, and, in particular embodiments, to a system and method for a location prediction-based network scheduler.

BACKGROUND

Location information technology for user equipments (UEs) is becoming more mature. Location information can be obtained by UEs such as a smartphones, a laptop or table computer, or other mobile user devices equipped with a Global Positioning System (GPS) or other location estimation technology. Knowledge of locations of UEs can be used to select appropriate radio network nodes, such as cellular base stations (BSs), to serve the UEs. For example, the UE location may be used to determine cellular traffic offloading to a WiFi hotspot. UE location can also be used to better serve the UE and improve UE quality of experience (QoE) and quality of service (QoS). Typically, the UE location is determined for current time or next limited time window, which may not be suitable in some scenarios due to rapid or dynamic changes in UE movements or network conditions. There is a need for a UE mobility and traffic management scheme that can efficiently handle dynamic UE and network scenarios.

SUMMARY OF THE INVENTION

In accordance with an embodiment of the disclosure, a method by a location prediction-based network scheduler includes obtaining location prediction information for a user equipment (UE) for a next time window comprising a plurality of next time slots, wherein a quantity of next time slots in the next time window is predefined. The method further includes obtaining available network resource prediction for the next time slots, and determining, for each of the next time slots, a weight value as a priority parameter for forwarding data to the UE in accordance with the location prediction information and the available network resource prediction for the next time slots. The method also includes providing a traffic engineering (TE) function in a network with the determined weight value for a first time slot in the next time slots.

In accordance with another embodiment of the disclosure, a method by a network component for location prediction-based scheduling includes receiving, from a UE location prediction based scheduler, a weight value as a priority parameter for forwarding data for a UE in a network for a first time slot in a sequence of next time slots. The weight value is determined for a next time window comprising the sequence of next time slots according to location prediction information for the UE and available network resource prediction. The method further includes optimizing, for the first time slot in the next time slots, the weight value, a route, a data rate, a source, and a destination for forwarding the data to the UE. The weight value is then indicated to a scheduler at a radio node, an access node, or a cache node in the network.

In accordance with another embodiment of the disclosure, a method by a radio node supporting location prediction-based scheduling includes receiving, from a TE function in a network, a weight value as a priority parameter for forwarding the data to a UE. The weight value is determined for a next time window according to location prediction information for the UE and available network resource prediction. The method further includes forwarding or caching the data in a next time slot considering a channel condition for the UE and the weight value.

In accordance with another embodiment of the disclosure, a network component for location prediction-based scheduling comprises at least one processor and a non-transitory computer readable storage medium storing programming for execution by the at least one processor. The programming includes instructions to obtain location prediction information for a UE for a next time window comprising a plurality of next time slots. The quantity of next time slots in the next time window is predefined. The programming includes further instructions to obtain available network resource prediction for the next time slots, and determine, for each of the next time slots, a weight value as a priority parameter for forwarding data to the UE in accordance with the location prediction information and the available network resource prediction for the next time slots. The determined weight value for a first time slot in the next time slots is provided to a TE function in the network with the determined weight value for a first time slot in the next time slots.

In accordance with yet another embodiment of the disclosure, a radio access node supporting location prediction-based scheduling comprises at least one processor and a non-transitory computer readable storage medium storing programming for execution by the at least one processor. The programming includes instructions to receive, from a TE function in a network, a weight value as a priority parameter for forwarding the data to a UE. The weight value is determined for a next time window according to location prediction information for the UE and available network resource prediction. The programming includes further instructions to forward or cache the data in a next time slot considering a channel condition for the UE and the weight value.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for UE mobility based traffic scheduling in wireless networks. The embodiments provide a location prediction-based network scheduler (NS) functionality, for instance at the management plane of a wireless network. The embodiments also include interfaces of the NS with traffic engineering (TE) functionality to enable location-prediction-based routing for UE traffic. The NS uses knowledge (e.g., via prediction) of future locations of UEs, and of network link capacity and spectral efficiency, to dynamically select best routes to transmit data (e.g., delay insensitive data or not real-time data) to the foreseeable locations of UEs. The NS (e.g., with the TE functionality) also determines the best time slots (current or next time slots) to transmit the data.

Figure 1:
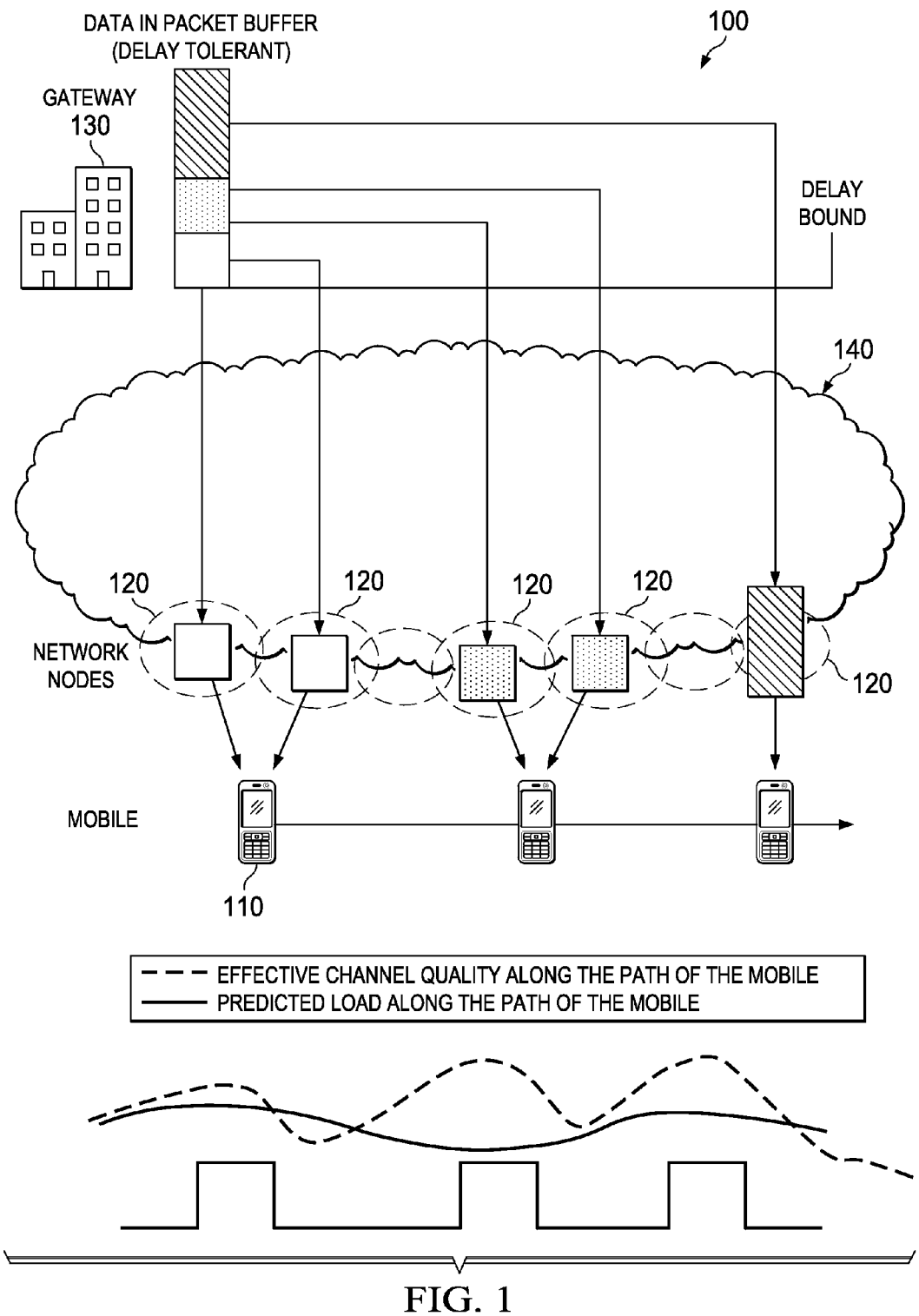
FIG. 1 illustrates an embodiment of a location prediction based network scheduler system for serving mobile users.

FIG. 1 shows an embodiment of a location prediction based NS system 100 for serving mobile users. Based on mobile location prediction, a NS (not shown) for a network 140, e.g., at a network server or a network management plane, selects a suitable set of cache/buffer nodes 130 (e.g., a gateway) and access nodes 120 with associated routes/rates to cache (or buffer) and forward segments of data ensuring that the data is available when an intended mobile UE 110 for receiving the data moves in the nearby area. The cache/buffer nodes 130 include any network nodes (e.g., gateways, routers, storage media) capable of temporary buffering or caching data. The access nodes 120 include radio nodes (e.g., base stations) and may even include other mobile UEs collaborating with the intended UE (UEs acting as relays with the capability to decode, store and forward data). Both buffer/cache nodes 130 and access nodes 120 are part of the routing paths for data.

The data scheduling on the wireless links between the radio nodes or access nodes 120 and the UE 110 is set by schedulers at the access nodes 120 that use the status of transmission queues, the channel quality, the resource allocation history, the receiver-side buffer state, and/or the quality of service (QoS) requirements as factors for determining the scheduling of data on the wireless links. The status of transmission queues can be used for minimizing packet delivery delays, e.g., the longer the queue, the higher the metric. The channel quality can be used to allocate resources to users experiencing better channel conditions, e.g., the higher the expected throughput, the higher the metric. The resource allocation history, which includes information about the past achieved performance, can be used to improve fairness, e.g., the lower the past achieved throughput, the higher the metric. The receiver-side buffer state may be used to avoid buffer over-flows/under-runs, e.g., the higher the available space in the receiving buffer, the higher the metric. The quality of service (QoS) requirements may be used to drive specific policies with the aim of meeting QoS requirements for specific flows.

The NS and TE functions of the network 140 provide some level of abstraction for the schedulers of the access nodes 120. The TE influences the scheduling metrics by sending a set of "proposed" weights for the flows considered by the schedulers, modifying the scheduling priority of flows. The TE determines the weights according to results from the NS, based on UE location prediction and other inputs described above. The weights are "proposed" to the schedulers, e.g., as weight parameters for prioritizing data transmission resources over time slots, but the selection of the final weights used by the schedulers is in the total control of the schedulers. The scheduling abstraction in NS and TE functions is a model of what resources the schedulers are expected to provide to each flow, as a function of time (within the considered time slots of interest), given the predicted position of UEs and the factors described above for determining the data scheduling on the wireless links. This scheduling abstraction is constantly updated (keeping track of what the scheduler has done in the previous time slot) using the different NS/TE inputs.

Figure 2:
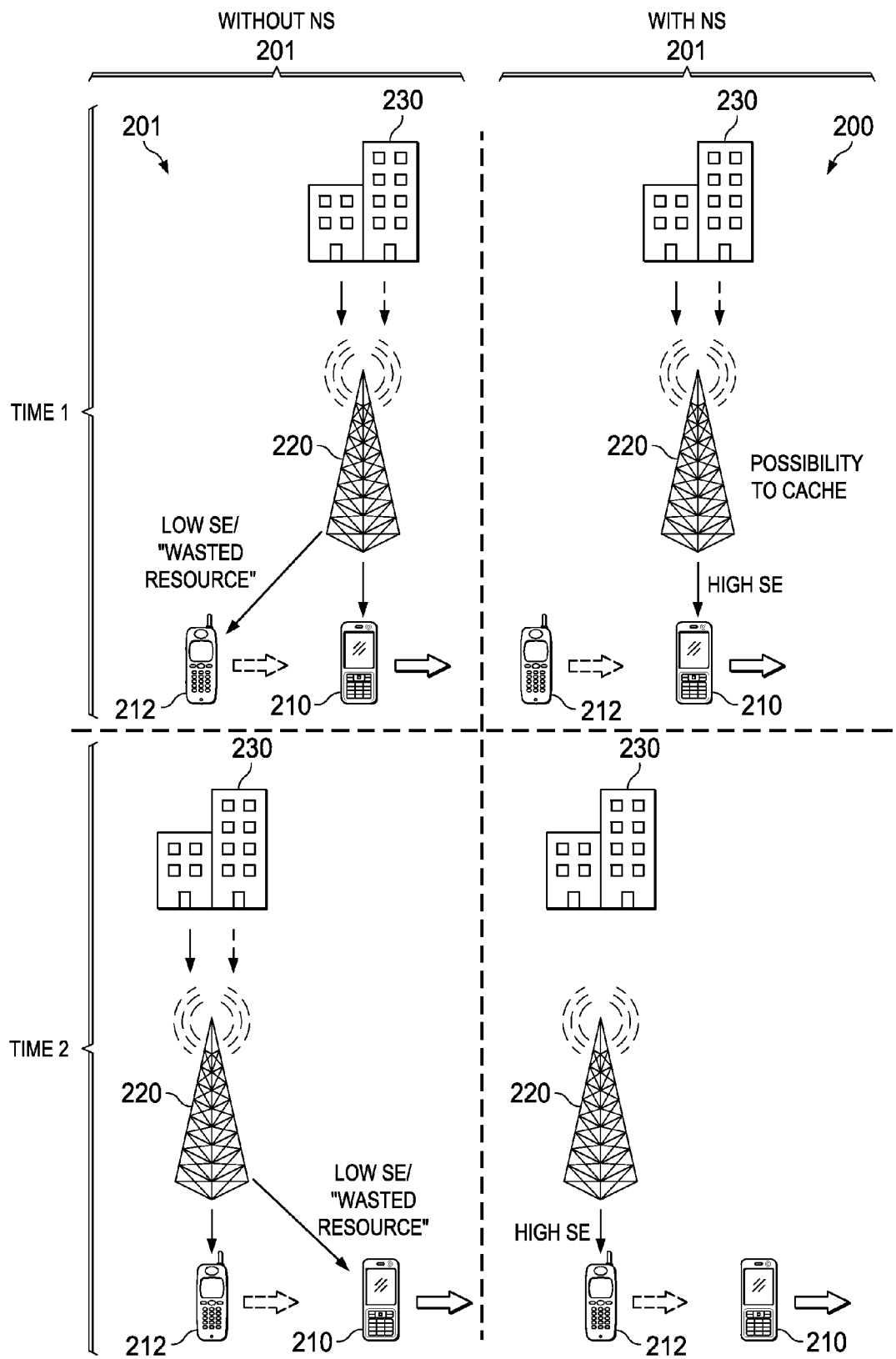
FIG. 2 illustrates a scenario of using a network scheduler to serve mobile UEs.

FIG. 2 illustrates a scenario 200 of using combined NS and TE optimization to serve a first UE 210 and second UE 212 on the move. The scenario 200 shows two consecutive time slots (time 1 and time 2) capturing movements of UE 210 and UE 212. In the scenario 200, a gateway 230 sends the data for both UEs 210 and 212 to a radio node 220 in the first time slot (time 1), e.g., if it has the capacity to do so and is therefore maximizing the amount of free resources for the next slot in that link. The scheduling weights sent (e.g., by a TE functionality) to the radio node recommend to the scheduler not to schedule data transmission for UE 212 for the first time slot, so that the data for that user would be cached in the radio node. However, the weights for UE 210 would allow the scheduler to use radio resources for sending data to that UE at time 1. For the next time slot, assuming that all data was pre-cached in the radio node, the scheduling weights would be modified to allow for UE 212 to be allocated radio resources. The scenario 200 is compared to another scheduling scenario 201 without the NS scheme of considering the UEs' mobility. For scenario 201, without NS, the gateway 230 would push data to the radio node 220 for both UEs 210 and 212. The scheduler of the radio node 220 provides its own scheduling without receiving weights from the network TE function so that, for example, if a "fair" scheduler (with fairness as a dominating scheduling criteria) is implemented, low spectral efficiency (SE) resources could be used for UEs that have "bad" channel conditions. Without the NS function and hence without mobility prediction, the scheduler may know that the channel condition is bad and schedules radio node resources accordingly, but has no means to take into consideration the fact that the channel is going to improve in the future. Alternatively, when the channel condition is "good", the scheduler may detect the good channel, but has no means to anticipate that the channel quality is soon going to degrade considerably.

Figure 3:
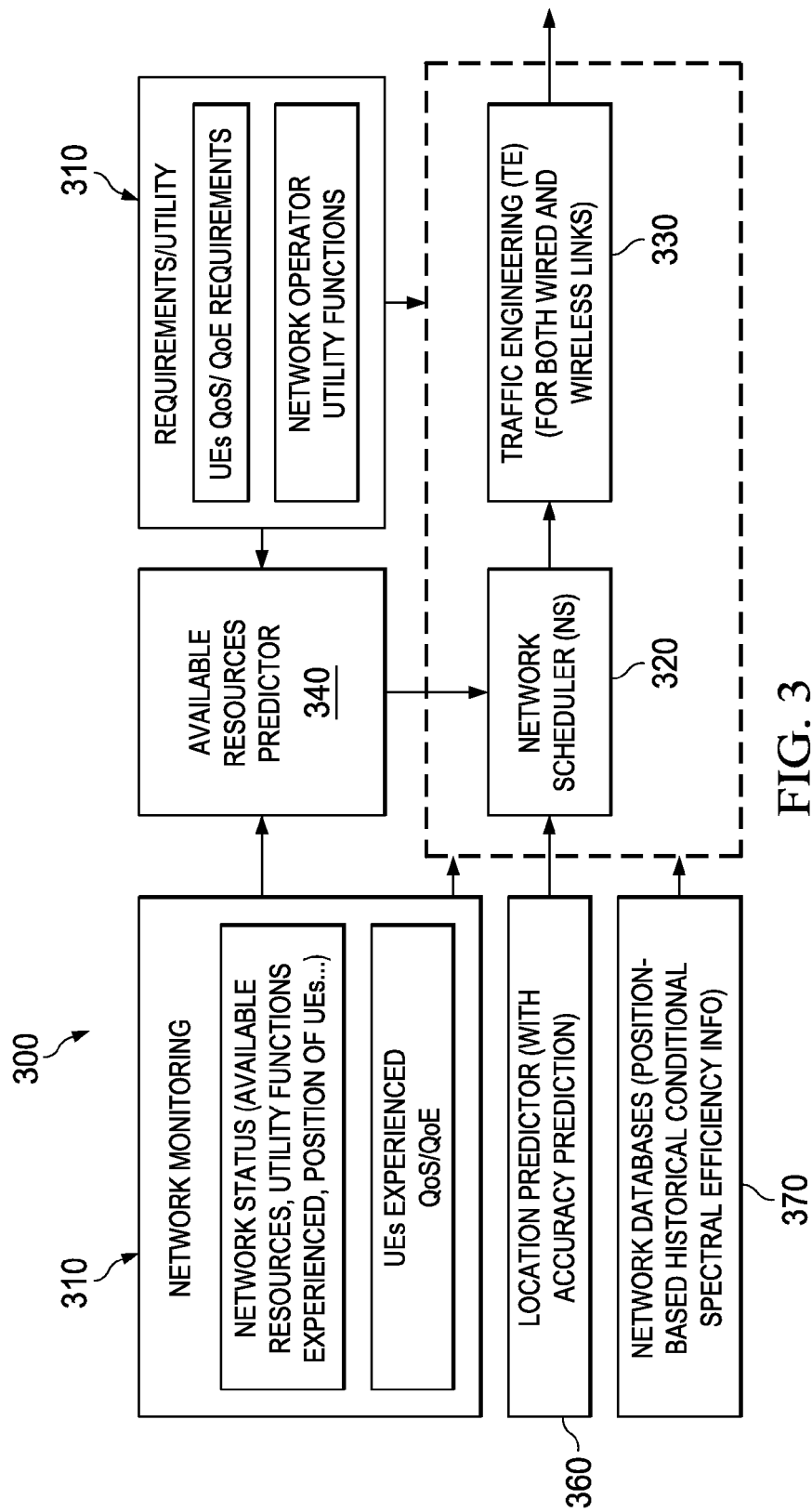
FIG. 3 illustrates an embodiment of a system using a network scheduler to manage users mobility and traffic.

FIG. 3 illustrates an embodiment of a system 300 using a network scheduler to manage users' mobility and traffic. The system 300 comprises a network monitoring function 310, a NS 320 and a TE function or module 330. The system 300 also uses an available resources predictor 340, a location predictor 360, and network databases 370, in addition to given requirements/utility information 350 for traffic handling. The functions/modules or entities of the system 300 may be implemented using software, hardware, or both at one or more locations in the network, e.g., at one or different servers or controllers. The network monitoring function 310 provides network status information and UEs' quality of service (QoS)/quality of experience (QoE) feedback to the NS 320. This information may also be sent to the TE function 330. The TE function 330 plans, for a next time slot representing a relatively short time window for optimization, traffic scheduling and routing and priority/weights for the UEs across the network for both wired and wireless links in accordance with the network status and UEs experienced Qos/ QoE. The traffic routing and priority/weights are determined by the TE function 330 using the requirements/utility information 350, such as UEs' QoS/QoE requirements and network operator utility, and further using the network databases 370, which provides position-based historical conditional spectral efficiency information. Additionally, the NS 320 determines traffic priority/weights, for a plurality of consecutive next time slots represented an extended time window in comparison to the TE's optimization time window, for UE traffic at the access or radio nodes of the network in accordance with the network status and UE's QoS/QoE feedback from the network monitoring function 310. The NS 320 also uses available resource information provided by the predictor 340 and predicted UE location information provided by the location predictor 360 for determining the priority/weights of UE traffic at the next time slots. The predictor 340 may use the requirements/utility information 350 and network status and UE QoS/QoE information from the network monitoring function 310 to predict available resource at the next time slots. The number of time slots is determined according to a defined future time window to consider. Expanding the future time window to look further ahead in the future is desirable but can result in larger prediction errors. This may be a practical limit on the number of future time slots that can be considered. The NS 320 then provides the resulting data priority/weights information for the next time slot to the TE function 330. The TE function 330 uses this information from the NS 320 for determining traffic scheduling and routing, including weights for UEs, at the next time slot to improve SE and hence preserve and efficiently use resources. In an embodiment, the NS 320 provides the data weights to the UEs directly, with or without the TE function 330. The NS 320 may also indicate to the TE function 330 a group of access/radio nodes for serving the same UE.

In the system 300, the NS 320 can share input information with the TE function 330. The shared input includes the position-based information from the network databases 370. This comprises a probabilistic model of SEs from relevant radio nodes (or BSs) at possible UE positions. The shared input from UE agents includes detailed UE QoS/QoE requirements (e.g., delay, delay jitter, throughput, power . . . ). The shared input from the network operator includes detailed utility functions/configuration (e.g., minimizing resource utilization, earliest session completion time, minimizing number of active access nodes . . . ). The QoS/QoE experienced by UEs, the network status (e.g., remaining resources, energy consumption . . . ), and the utility experienced by network operators from the network monitoring 310 function 310 can also be shared between the NS 310 and the TE function 330. Additionally, the NS 320 can receive input that is not shared with the TE function 330. The non-shared input includes a probabilistic model of the UE future position from the location predictor 360. The non-shared input also includes information provided by the available resource predictor 340 using a probabilistic model of resources used by traffic not presently under the NS control. For instance, the model covers UEs that can handoff to geographical regions under the control of the NS 320 from outside regions, or dynamic bandwidth reservation for handovers and new session admissions. The model can also cover the case for which resources were previously reserved (e.g., slicing or resources reserved for specific traffic types/flows).

The outputs from the TE function 330 include source and destination pairs for forwarding the traffic for the next time slot on wired connections. The sources may include network nodes, gateways, and caches. The destinations may include caches at access/radio nodes or at intermediate nodes. The TE function 330 also determines the required rates for the users' traffic, and possibly associated route candidates. The outputs from the NS 320 to the TE function 320 include probabilistic distribution functions for SEs associated with wireless links (for backhaul or access (radio) nodes), as calculated by the NS 320 over a plurality of next time slots. The SEs distribution functions reflect the predicted probabilistic UEs/nodes positions, e.g., using a position-based SE database to do the mapping. The NS 320 also provides the TE function 330 with data priority/weight information to consider in the scheduling. The TE function 330 needs to know, for example, the portions of data which should be cached at an access node and not be made available to a radio node right away. The NS 320 may also indicate to the TE function 320 a group of access nodes for serving a UE. As described above, the outputs of the NS 320 may include the weights values directly to the UEs.

As described above, the weights given to the scheduler are recommendations for the scheduler to take into account when scheduling the radio node resources for serving the UEs. Even if the weights from the NS/TE network functions are applied by the scheduler of the radio/access node, with the traffic and channel unpredictability, the weights may not practically always be directly mapped to a precise amount of data sent/cached. A weight of zero could guarantee an amount of data sent equal to zero (data is entirely cached). However, other weight values would result in some priority of users over other users, but not necessarily for a precise intended amount of data sent/cached.

Figure 4:
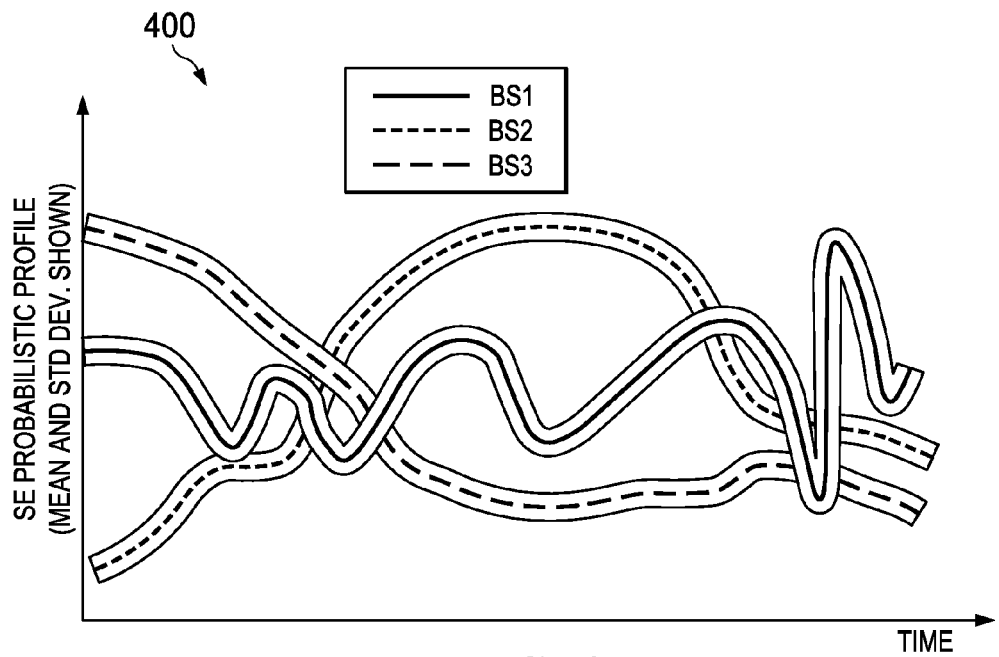
FIG. 4 illustrates an example of establishing spectrum efficiency versus time based on UE location prediction.

FIG. 4 is a graph 400 showing an example of establishing spectrum efficiency versus time based on UE location prediction. The graph 440 shows calculated (simulated) SE probabilistic profiles for three base stations (BS1, BS2, BS3) along the time axis. The profiles can be obtained by the NS by combining inputs from the location predictor and the location-based database providing SEs from the different BSs. The predicted locations from the location predictor may include position prediction errors, which typically increase as location prediction is carried over further extended future time (more considered time slots). The SE probabilistic profile is a cumulative distribution function (CDF) corresponding to predicted UEs' locations over time for each BS.

Figure 5:
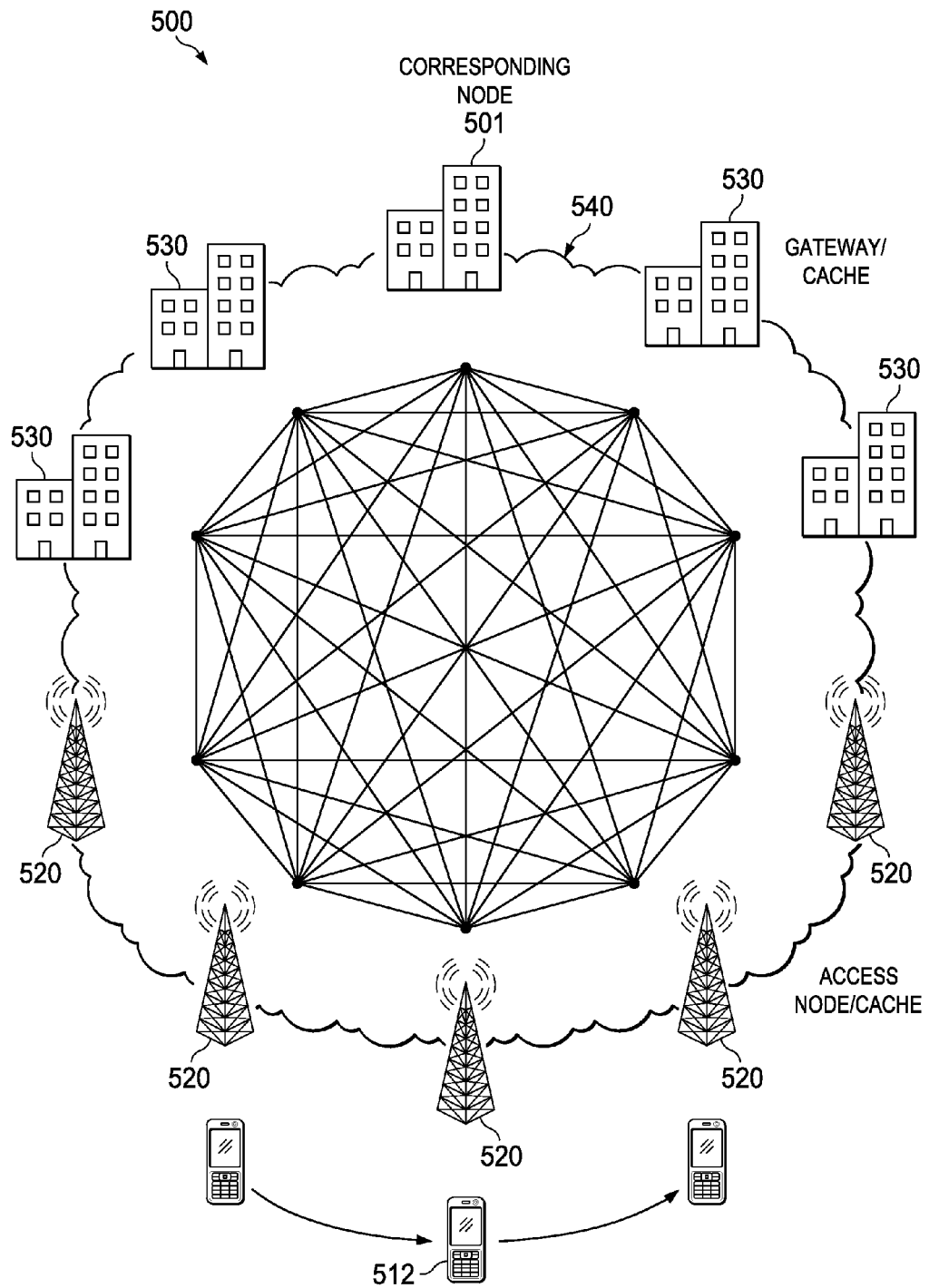
FIG. 5 illustrates a scenario of scheduling UE mobility and traffic considering future time slots.

FIG. 5 illustrates a scenario 500 of scheduling UE mobility and traffic considering future time slots. In the scenario 500, a NS and TE function schedule data priority/weights for a plurality of next time slots, in other words data portion distribution across radio nodes and time slots, using UE mobility prediction and available resources prediction as described above. Data portions sent from a source or corresponding node 501 are routed to selected gateways/cache nodes 530 in the network 540 and scheduled with different weights to ensure or recommend the forwarding of the data by selected radio nodes 520 according to location prediction of the moving UE 512 on a time slot basis. The "recommended" weights, at each time slot, allow the UE 512 to obtain a portion of the data from a close radio node 520 with acceptable or high SE while preserving resources (e.g., transmission power, bandwidth usage) as possible. Although scenario 500 describes the behavior of data scheduling and forwarding for one UE 512, the scenario 500 applies similarly to handle data for multiple UEs within the same time slots and using at least some shared gateways/cache nodes 530 and radio nodes 520.

To handle UE data based on UE mobility prediction, the NS interacts with a TE module or function of the network, as described in the system 300. The NS, and similarly the TE function, determines the input/output data rate per time slot. The NS and TE function use the same sources/destinations for selecting the paths and routing. The NS optimizes the traffic scheduling for a selected number of next time slots, while the TE uses the results from the NS to optimize traffic forwarding for one next time slot. Further, the NS keeps track internally of what/how data is to be routed for the next selected number of time slots to eventually reach the UEs (with caches). Effectively, the selected number of time slots defines a future time window. The TE uses these results from the NS to determine the source/destination pairs with associated rates and/or priority/weights for the next time slot. Specifically, the NS may only output to the TE its optimization results (e.g., including determined weights) for only the next slot, and at each next time slot interval, updates the optimized internal results for a next future time window (considering a same number of future time slots). The TE function outputs actual routing instructions and weights on a time slot by slot basis. The TE may use a more sophisticated routing/scheduling algorithm than the NS but on a problem with a smaller time dimensionality (on a one time slot basis instead of a plurality of time slots).

In the case of assuming high backhaul capacity, the network capacity is constrained mainly by the radio access links. As such, getting the data to the radio nodes or BSs may not be an issue. However, the optimization problem lies in selecting the right BSs and the right time slots (according to UE location and channel conditions over time) to transmit over the air to the UEs. The NS (with the TE) uses the knowledge of future locations of UEs and the expected SEs in such locations to make decisions regarding transmission rates and candidate BSs for every UE in every timeslot to satisfy the UE QoS/QoE requirements as well as operator/network targeted objective/utility functions. The NS can solve a Linear Programming (LP) optimization problem, for instance, in a centralized way for the full network.

Figure 6:
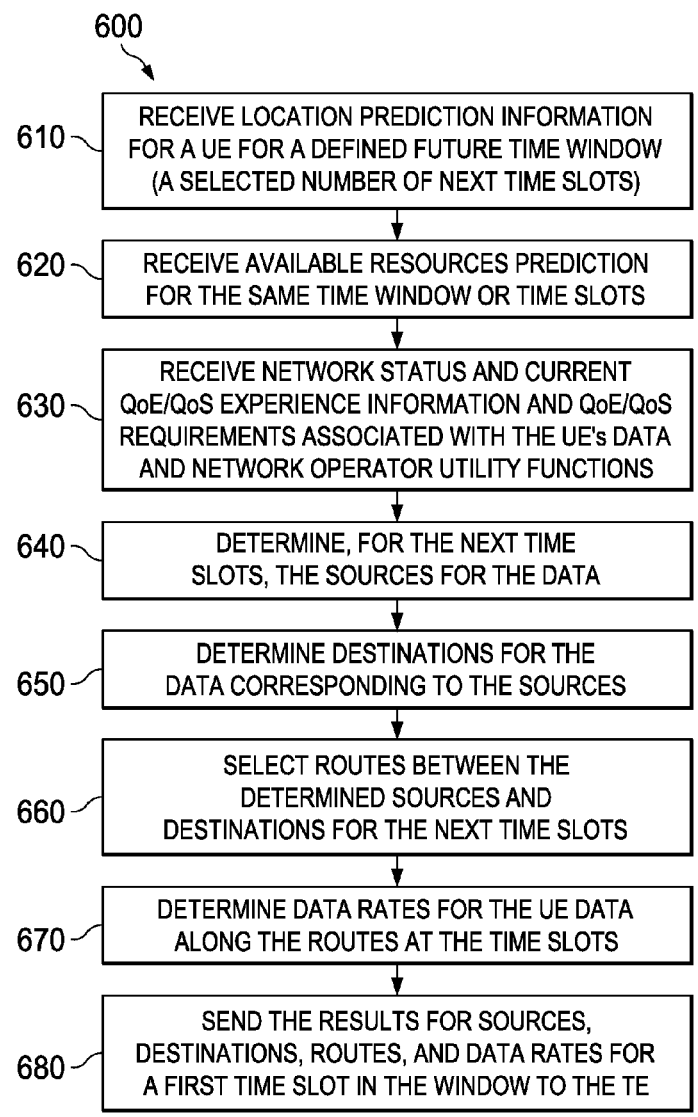
FIG. 6 illustrates an embodiment of a network scheduler method for scheduling mobile UE traffic.

FIG. 6 illustrates an embodiment of a network scheduler method 600 for scheduling mobile UE traffic. The method 600 may be implemented by a NS component, such as the NS 320 of the system 300. At step 610, The NS receives location prediction information for a UE, e.g., from a location prediction module. The location prediction information considers a defined future time window (or a selected number of next time slots). The NS may also obtain positioned-based historical conditional SE information from a network database. At step 620, the NS receives available resources prediction, e.g., from a corresponding predictor, for the same time window or time slots. At step 630, the NS receives network status and current QoE/QoS UE experience information and QoE/QoS requirements associated with the UE's data and network operator utility functions. The steps above can be implemented simultaneously or in any suitable order.

At step 640, the NS determines, for the next time slots, the sources for the data, e.g., including a source or corresponding node, gateways, and/or caches on intermediate network nodes. At step 650, the NS determines destinations for the data, e.g., including cache on intermediate nodes or on access/radio nodes. The access/radio nodes may include both wired and wireless nodes associated with wired and wireless links. At step 660, the NS selects routes between the determined sources and destinations for the next time slots. At step 670, the NS determines data rates for the UE data along the routes at the time slots. The sources, destinations, routes, and data rates are dynamically selected according to both UE location and available resource prediction, and further according to network status, current QoE/QoS UE experience, and QoE/QoS requirements and network operator utility functions, at each of the time slots. Thus, the sources, destinations, routes, and/or rates may change from time slot to time slot to ensure high SE and improve resource usage. At step 675, the NS determines, at each of the time slots, weights for the data at the destinations, e.g., at caches on access/radio nodes and possibly caches at intermediate nodes, according to both UE location and available resource predictions, and further according to the data rates, network status, current QoE/QoS UE experience, and QoE/QoS requirements and network operator utility functions. At step 680, the NS sends, to the UE, the results for sources, destinations, routes, data rates, and weights for a first time slot in the window. The results may be used as inputs by the TE for further optimizing the traffic scheduling and forwarding and determining weights for that time slot.

The NS can then start at a next time slot and repeat the steps above for a next time window or sequence of time slots. Providing optimization results for a next time slot to the TE based on an expanded future time window (a sequence of future time slots) provides near short time optimization at the TE according to longer future prediction at the NS. Thus, the TE optimizes traffic at the next time window by anticipating further in the future the UE and network conditions including UE mobility.

Figure 7:
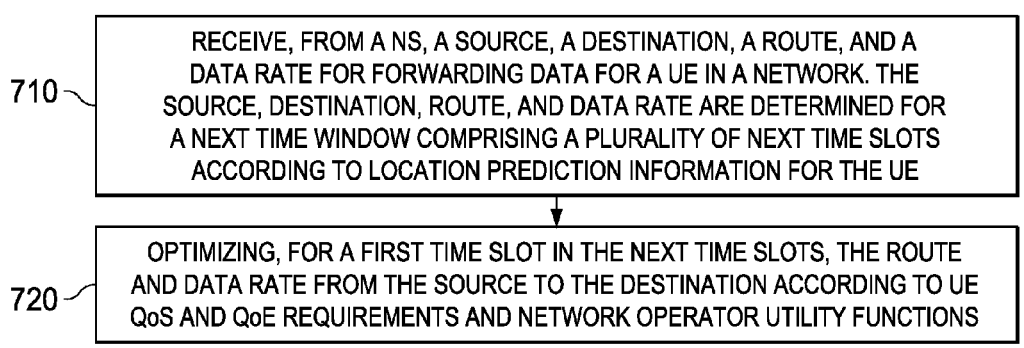
FIG. 7 illustrates an embodiment of a method for a TE communicating with a network scheduler for scheduling mobile UE traffic.

FIG. 7 illustrates an embodiment of a method 700 for a TE communicating with a NS for scheduling mobile UE traffic. The method 700 may be implemented by a TE module communicating with a NS component, such as the NS 320 of the system 300. The method 700 may be implemented with the method 600, for example by the TE module 330 and NS 320 respectively. At step 710, the TE module receives, from the NS, a source, a destination, a route, and a data rate for forwarding data for a UE in the network. The source, destination, route, and data rate are determined for a next time window comprising a plurality of next time slots according to location prediction information for the UE. At step 720, the TE module optimizes, for a first time slot in the next time slots, the route and data rate from the source to the destination according to UE QoS and QoE requirements and network operator utility functions. The TE module can also use position-based historical SE information from a network database to further optimize the route and data rate for the first time slot.

Figure 8:
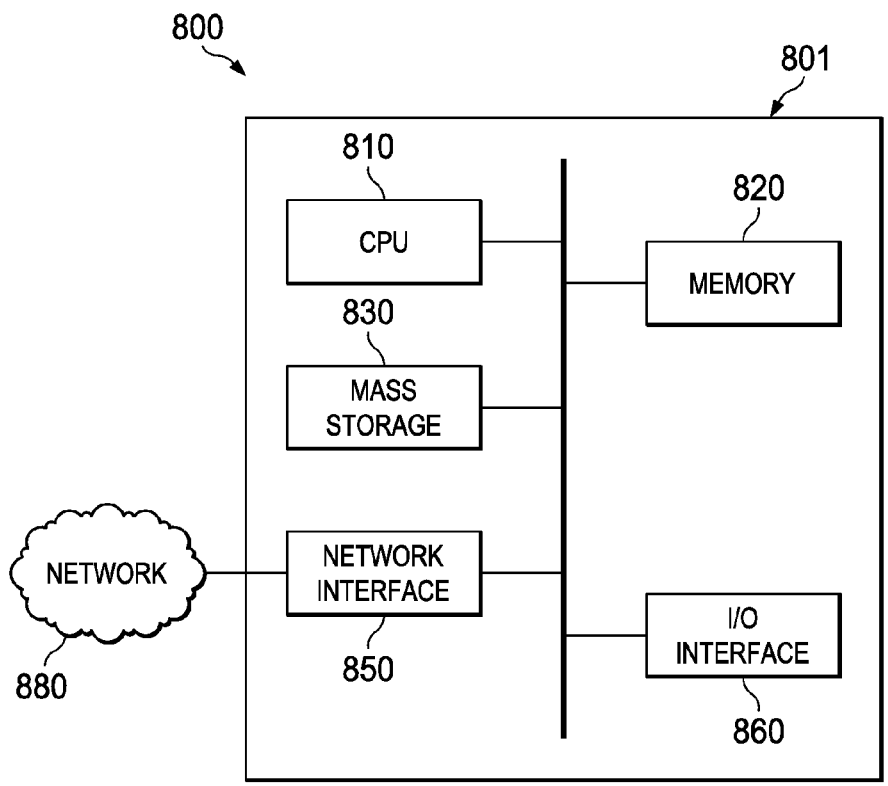
FIG. 8 is a diagram of a processing system that can be used to implement various embodiments.

FIG. 8 is a block diagram of an exemplary processing system 800 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a network interfaces, storage interfaces, and the like. The processing unit 801 may include a central processing unit (CPU) 810, a memory 820, a mass storage device 830, and an I/O interface 860 connected to a bus. The bus may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a location prediction-based network scheduler, the method comprising:
    obtaining location prediction information for a user equipment (UE) for a next time window comprising a plurality of next time slots, wherein a quantity of next time slots in the next time window is predefined;
    obtaining available network resource prediction for the next time slots;
    determining, for each of the next time slots, a weight value as a priority parameter for forwarding data to the UE in accordance with the location prediction information and the available network resource prediction for the next time slots; and
    providing a traffic engineering (TE) function in a network with the determined weight value for a first time slot in the next time slots.

2. The method of claim 1 further comprising:
    determining, for each of the next time slots, a source, a destination, a route, and a data rate for forwarding the data to the UE in accordance with the location prediction information and the available network resource prediction for the next time slots; and
    providing the TE function with the determined source, destination, route, and data rate for the first time slot in the next time slots.

3. The method of claim 1 further comprising obtaining current network status and UE experience information, wherein the weight value is further determined in accordance with the current network status and UE experience information.

4. The method of claim 1 further comprising obtaining UE quality of service (QoS) and quality of experience (QoE) requirements and network operator utility functions, wherein the weight value is further determined in accordance with the UE QoS and QoE requirements and network operator utility functions.

5. The method of claim 1 further comprising obtaining position-based historical spectral efficiency (SE) information from a network database, wherein the weight value is further determined in accordance with the position-based historical SE information.

6. The method of claim 1 further comprising:
    obtaining UE quality of service (QoS) and quality of experience (QoE) requirements and network operator utility functions;
    obtaining current network status and UE experience information; and
    determining the location prediction information for the UE in accordance with the UE QoS and QoE requirements and network operator utility functions and the current network status and UE experience information.

7. The method of claim 1 further comprising:
    obtaining position-based historical spectral efficiency (SE) information from a network database;
    detecting current UE location; and
    determining the location prediction information for the UE in accordance with the current UE location and the position-based historical spectral efficiency (SE) information.

8. The method of claim 1 further comprising optimizing for the first time slot, at the TE function, the weight value, a route, a data rate, a source, and a destination for forwarding the data to the UE.

9. The method of claim 1 further comprising:
    calculating a cumulative distribution function (CDF) for the location prediction information for the next time slots, the CDF representing a spectrum efficiency versus time based on UE location prediction; and
    forwarding the CDF to the TE function.

10. A method by a network component for location prediction-based scheduling, the method comprising:
    receiving, from a user equipment (UE) location prediction based scheduler, a weight value as a priority parameter for forwarding data for a UE in a network for a first time slot in a sequence of next time slots, wherein the weight value is determined for a next time window comprising the sequence of next time slots according to location prediction information for the UE and available network resource prediction;
    optimizing, for the first time slot in the next time slots, the weight value, a route, a data rate, a source, and a destination for forwarding the data to the UE; and
    indicating the weight value to a scheduler at a radio node, an access node, or a cache node in the network.

11. The method of claim 10, wherein optimizing the weight value, route, data rate, source, and destination includes:

obtaining current network status and UE experience information; and tuning, using the UE location prediction based scheduler, the weight value, source, destination, route, and data rate in accordance with the location prediction information and the available network resource prediction for the next time slots and the current network status and UE experience information.

12. The method of claim 10, wherein optimizing the weight value, route, data rate, source, and destination includes:

obtaining current network status and UE experience information;

obtaining UE quality of service (QoS) and quality of experience (QoE) requirements and network operator utility functions; and obtaining position-based historical spectral efficiency (SE) information from a network database; and tuning the weight value, route and data rate from the source to the destination in accordance with the current network status and UE experience information, the UE QoS and QoE requirements and network operator utility functions, and the position-based historical SE information.

13. The method of claim 10, wherein optimizing the weight value, route, data rate, source, and destination includes:

receiving, from the location prediction based scheduler, cumulative distribution function (CDF) for the location prediction information for the first time slot in the next time slots, the CDF representing a spectrum efficiency versus time based on UE location prediction; and tuning the weight value, route and data rate from the source to the destination are further optimized in accordance with the CDF.

14. The method of claim 10, wherein the network corresponds to a wireless network, and wherein the destination is a radio node configured to communicate with the UE via a wireless link.

15. The method of claim 10, wherein the route includes a node configured to cache the data at one or more of the next time slots in accordance to the weight value.

16. The method of claim 10, wherein the source is a network node or gateway, and wherein the destination is a radio node configured to communicate with the UE via a wireless link.

17. A method by a radio node supporting location prediction-based scheduling, the method comprising:

receiving, from a traffic engineering (TE) function in a network, a weight value as a priority parameter for forwarding the data to a user equipment (UE), wherein the weight value is determined for a next time window according to location prediction information for the UE and available network resource prediction; and forwarding or caching the data in a next time slot considering a channel condition for the UE and the weight value.

18. The method of claim 17, wherein the weight value prioritizes caching the data in the next time slot when the UE is expected to have an improved channel condition after the next time slot.

19. The method of claim 17, wherein the weight value prioritizes forwarding the data in the next time slot when the UE is expected to have a degraded channel condition beyond the next time slot.

20. The method of claim 17 further comprising receiving from the TE function a route, a data rate, a source, and a destination for forwarding the data.

21. The method of claim 17, wherein the data is delay insensitive data and not real-time data.

22. A network component for location prediction-based scheduling, the network component comprising:

at least one processor; and a non-transitory computer readable storage medium storing programming for execution by the at least one processor, the programming including instructions to:

obtain location prediction information for a user equipment (UE) for a next time window comprising a plurality of next time slots, wherein a quantity of next time slots in the next time window is predefined;

obtain available network resource prediction for the next time slots;

determine, for each of the next time slots, a weight value as a priority parameter for forwarding data to the UE in accordance with the location prediction information and the available network resource prediction for the next time slots; and provide a traffic engineering (TE) function in the network with the determined weight value for a first time slot in the next time slots.

23. The network component of claim 22, wherein the programming includes further instructions to obtain current network status and UE experience information, wherein the weight value is further determined in accordance with the current network status and UE experience information.

24. The network component of claim 22, wherein the programming includes further instructions to optimize for the first time slot, at the TE function, the weight value, a route, a data rate, a source, and a destination for forwarding the data to the UE.

25. The network component of claim 24, wherein the source is a network node or gateway, and wherein the destination is a radio node configured to communicate with the UE via a wireless link.

26. A radio access node supporting location prediction-based scheduling, the radio access node comprising:

at least one processor; and a non-transitory computer readable storage medium storing programming for execution by the at least one processor, the programming including instructions to:

receive, from a traffic engineering (TE) function in a network, a weight value as a priority parameter for forwarding the data to a user equipment (UE), wherein the weight value is determined for a next time window according to location prediction information for the UE and available network resource prediction; and forward or cache the data in a next time slot considering a channel condition for the UE and the weight value.

27. The radio access node of claim 26, wherein the weight value prioritizes caching the data in the next time slot when the UE is expected to have an improved channel condition after the next time slot.

28. The radio access node of claim 26, wherein the weight value prioritizes forwarding the data in the next time slot when the UE is expected to have a degraded channel condition beyond the next time slot.

* * * * *